Patented June 10, 1930

1,763,557

UNITED STATES PATENT OFFICE

GEORG KALISCHER AND HEINZ SCHEYER, OF FRANKFORT-ON-THE-MAIN, AND KARL KELLER, OF MAINKUR, NEAR FRANKFORT-ON-THE-MAIN, GERMANY, ASSIGNORS TO GENERAL ANILINE WORKS, INC., OF NEW YORK, N. Y., A CORPORATION OF DELAWARE

PROCESS FOR INTRODUCING AN ALDEHYDIC GROUP INTO HETEROCYCLIC NITROGEN COMPOUNDS

No Drawing. Application filed January 30, 1928, Serial No. 250,719, and in Germany February 2, 1927.

Vilsmeier and Haak (Berichte der duetschen chemischen Gesellschaft, vol. 60, page 119) describe a process for producing aldehydic derivatives of secondary and tertiary aromatic amines by the action of formylmethylaniline and phosphorus oxychloride thereon.

Now we have found the suprising fact, that the presence of such an aminogroup is not at all necessary for the process and that the reaction takes place when using heterocyclic compounds, in the molecule of which no aminogroups but nitrogen in ring binding is present.

Our process consists in acting on such heterocyclic nitrogen compounds in presence of a condensation agent containing chlorine with a formyl-amino compound of the general formula:

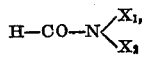

wherein $X_1$ and $X_2$ represent hydrogen or aryl, or $X_1$ represents aryl and $X_2$ represents alkyl. As heterocyclic nitrogen compounds not containing an aminogroup, which are suitable for our process may be named pyridine, quinoline, carbazol, N-alkyl derivatives of carbazol and naphthostyril.

The aldehydic derivatives thereof are mostly obtainable according to our process with an excellent yield and in a very pure state. They are important intermediates for the production of dyestuffs.

In order to further illustrate our invention the following examples are given, the parts being by weight and all temperatures in centigrade degrees. But we wish it to be understood that we are not limited to the particular conditions nor to the specific products mentioned therein.

Example 1

9,7 parts of N-ethylcarbazol are introduced without cooling into a mixture of 13,5 parts of formylmonomethylaniline and 15,3 parts of phosphorus oxychloride. The liquor turns to a reddish color and warms to about 80° with an evolution of hydrochloric acid. For finishing the reaction the mass is warmed for a short time on the waterbath. Then it is poured on water and the product of reaction, which separates first in an oily state, solidifies to a granular yellow precipitate. The new aldehydic compound thus obtained corresponds probably to the formula:

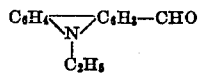

When recrystallized from the usual organic solvents, e. g. from alcohol it forms yellowish crystals melting at about 87°. It dissolves in sulfuric acid with an orange-yellow color. Its aldazine represents yellow needles soluble in sulfuric acid with a bluish red color.

The probable course of the reaction may be illustrated by the following hypothetical equations:

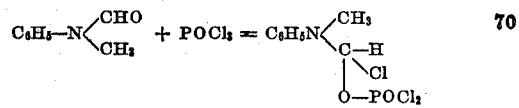

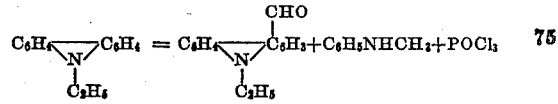

Example 2

Into a benzolic solution of a reaction mixture of 13,5 parts of formylmonomethylaniline and 15,4 parts of phosphorus oxychloride at ordinary temperature 16,9 parts of naphthostyril are introduced, which may be entirely dissolved by gently warming the liquor. After standing for about 24 hours the mass is poured on ice water, then a solution of soda is added until an alkaline reaction and benzene and the formed monomethylaniline is removed by steam distillation. The remaining reaction product may be purified by extracting it with warm alcohol. The new naphthostyrilaldehyde, which seems to correspond to the formula:

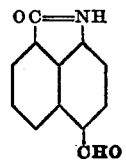

is thus obtained as a yellow powder, it crystallizes from monochlorobenzene as compact yellow prisms of about 228° M. P.

We claim:

1. Process for introducing an aldehydic group into heterocyclic nitrogen compounds which process comprises acting on heterocyclic nitrogen compounds in which no hydrogen atom is substituted by an aminogroup in presence of a condensation agent containing chlorine with a formylamino compound of the general formula

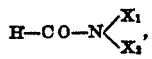

wherein $X_1$ and $X_2$ represent hydrogen or aryl, or $X_1$ represents aryl and $X_2$ represents alkyl.

2. As a new compound the N-ethylcarbazolaldehyde, corresponding probably to the formula:

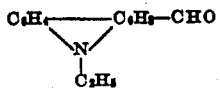

representing yellowish crystals of about 87° melting point, when recrystallized from the usual organic solvents, soluble in sulfuric acid with an orange-yellow color, forming an aldazine, which crystallizes as yellow needles and is soluble in sulfuric acid with a bluish red color.

In testimony whereof, we affix our signatures.

GEORG KALISCHER,
HEINZ SCHEYER,
KARL KELLER.